May 26, 1970 — D. H. WITTE — 3,513,963
CONVEYOR BELT FOR ELONGATED ARTICLES
Filed July 1, 1968 — 4 Sheets-Sheet 1

INVENTOR
DONALD H. WITTE
BY Robert M. Dunning
ATTORNEY

May 26, 1970     D. H. WITTE     3,513,963
CONVEYOR BELT FOR ELONGATED ARTICLES
Filed July 1, 1968     4 Sheets-Sheet 2
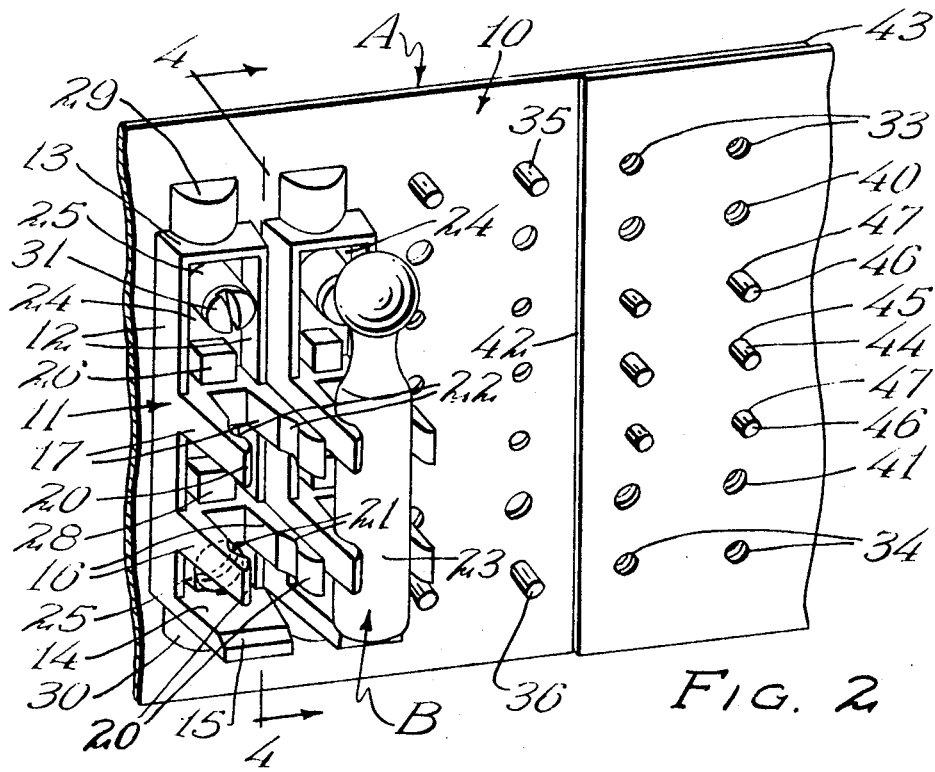
FIG. 2
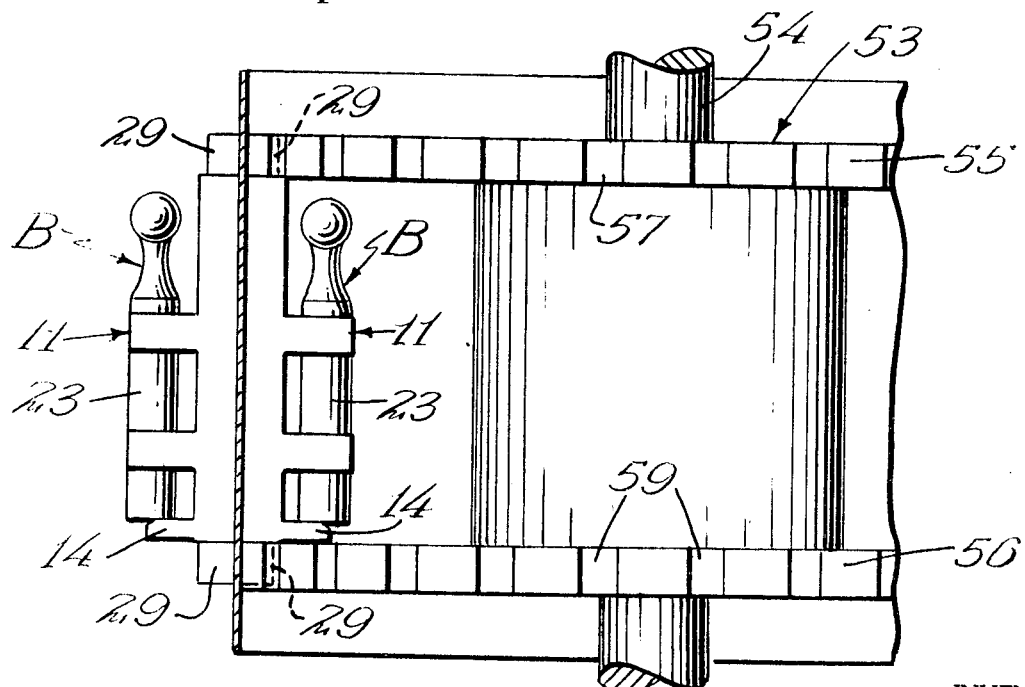
FIG. 3
INVENTOR
DONALD H. WITTE
BY
ATTORNEY May 26, 1970      D. H. WITTE      3,513,963
CONVEYOR BELT FOR ELONGATED ARTICLES
Filed July 1, 1968      4 Sheets-Sheet 3
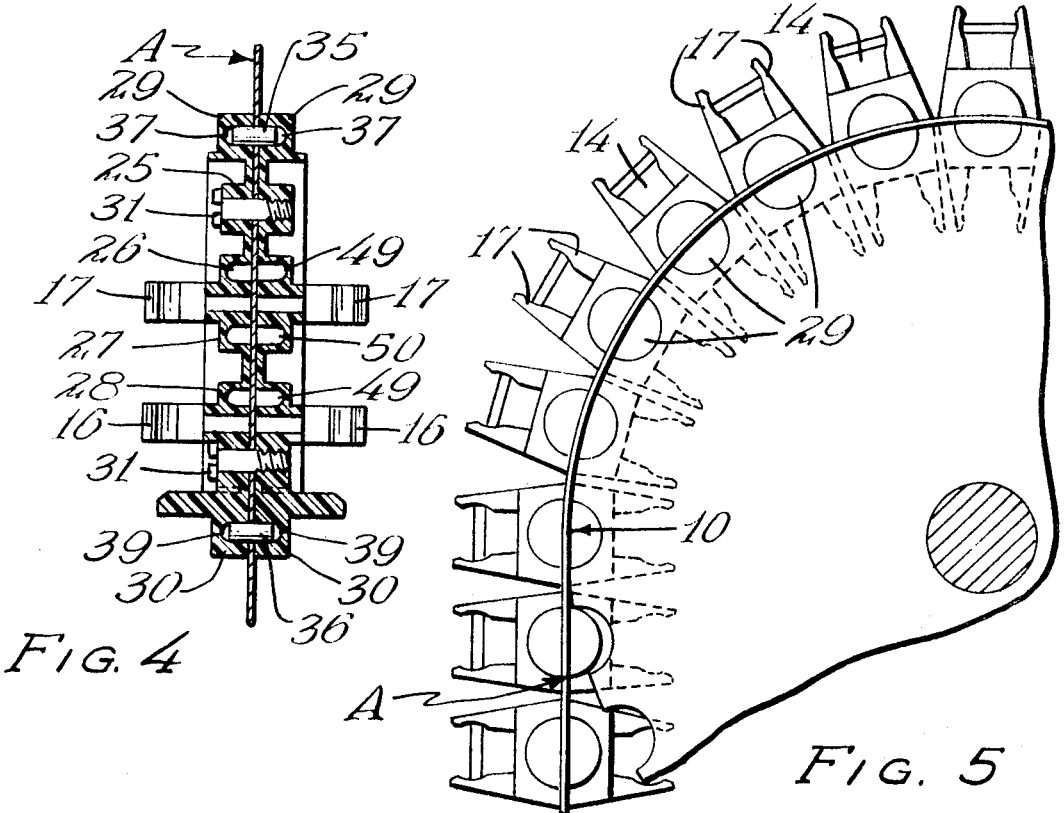
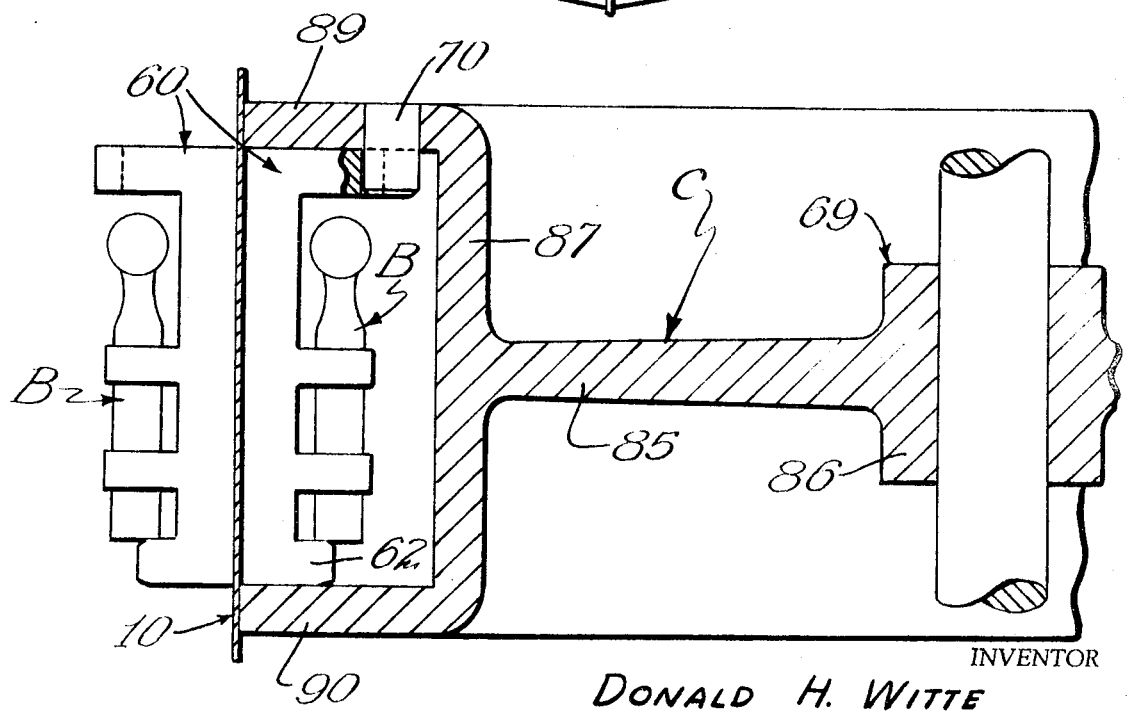
INVENTOR
DONALD H. WITTE
BY Robert M. Dunning
ATTORNEY May 26, 1970 D. H. WITTE 3,513,963
CONVEYOR BELT FOR ELONGATED ARTICLES
Filed July 1, 1968 4 Sheets-Sheet 4
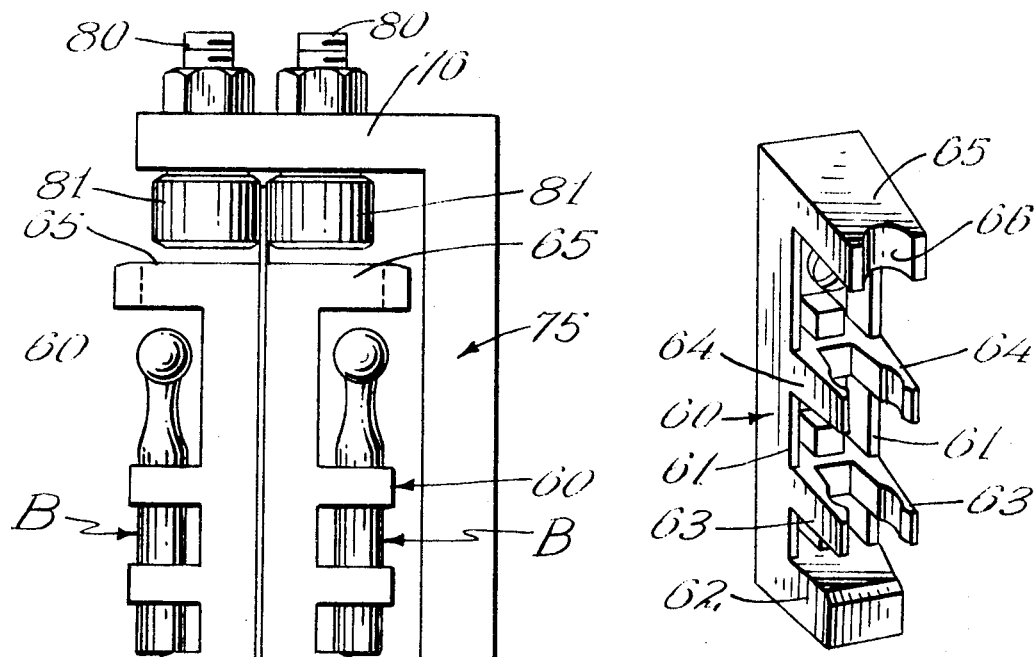
FIG. 7
FIG. 8
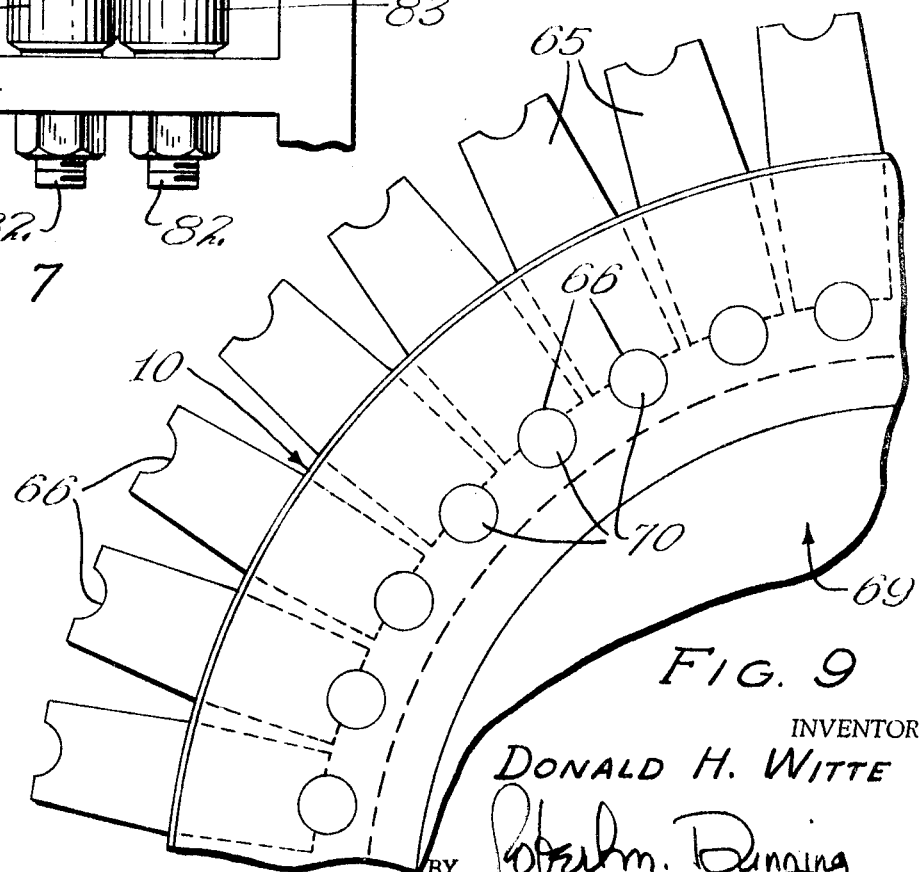
FIG. 9
INVENTOR
DONALD H. WITTE
BY Robert M. Dunning
ATTORNEY United States Patent Office 3,513,963
Patented May 26, 1970

3,513,963
CONVEYOR BELT FOR ELONGATED ARTICLES
Donald H. Witte, 1392 N. Pascal,
St. Paul, Minn. 55108
Filed July 1, 1968, Ser. No. 741,493
Int. Cl. B65g 15/00, 17/00
U.S. Cl. 198—131                                       10 Claims

ABSTRACT OF THE DISCLOSURE

The present invention lies in a vertical web conveyor having clips on its opposite sides to support elongated objects in horizontally spaced relation. The web is preferably of spring steel or an equivalent. The brackets secured to the web are preferably equipped to engage suitable sprockets for propelling the web. The objects supported by the clips may be readily stripped therefrom or automatically applied thereto during movement of the web.

---

This invention relates to an improvement in a conveyor for elongated objects and deals particularly with a flexible conveyor capable of conveying the objects from one position to another during the transportation, production and packaging thereof.

Many elongated objects must be transported from one position to another during the production and packaging operation. Where high speed operation is involved, and where the items being conveyed must be carefully handled, the conveyors must support the objects in spaced parallel relation out of contact with one another. Where the objects are hollow and must be filled they are normally filled in vertical position. In order to gain maximum speed from a conveyor, it is desirable that the objects be supported on both sides of a movable flexible web. Furthermore, as the conveyor must move in exactly timed relation to the mechanism for removing the objects from the conveyor and carrying them through the peripheral turret operations, and the like, it is necessary to provide means for synchronizing the conveyor with sprocket type driving pulleys if they are to be practical.

One object of the present invention resides in the provision of a conveyor capable of supporting elongated objects on opposite sides of a single flexible web so that both surfaces of the web may be used in the conveying process. The web is preferably formed of thin metal such as spring steel or the like which is sufficiently flexible to curve around sprockets or pulleys. In preferred form, the flexible web is punched at equal intervals to provide rows of apertures extending transversely of the direction of travel of the webs. Clips which may be formed of somewhat resilient plastic are bolted or otherwise secured in opposed relation on opposite sides of the web. Each clip is provided with means for releasably engaging a cylindrical or other elongated object as the web passes about its tortuous path. The clips are so arranged that the cylindrical objects may be stripped from the clips when desired and transferred to a cooperable turret or the like or may be stripped from the belt to drop into suitable packaging containers or the like.

In order to guide the conveyor and to hold the web in upright position, brackets are provided supporting pairs of rollers between which the web may move. The web extends above and below the clips so that the free edges of the web are free to pass between the guiding rollers which assist in supporting the weight of the conveyor belt and the clips and product supported thereby. Similar rollers or pulleys may be used to change the direction of the web.

In the preferred form of construction, each of the clips includes at its lower end a horizontally extending ledge which is designed to extend below the object being conveyed and to act as a support therefore. Each clip is also preferably provided with a pair of vertically spaced product engaging means or an equivalent object engaging means. Each of these engaging means preferably includes a pair of arms having outwardly tapered outer ends to simplify the insertion of the objects therebetween. Inwardly of these tapered ends, the arms which embrace the object are provided with opposed notches designed to hold the objects in a predetermined position while resting upon the supporting ledge which has been described.

The brackets or clips which are located on opposite sides of the web are held in parallel relation by suitable locating pins which extend through apertures in the web and extend into apertures in the opposed inner surfaces of the clips. The clips are held in place by bolts or similar fastening means extending through the web and securing the clips in contact with opposite surfaces of the web.

A further feature of the present invention resides in the fact that the fastening means for securing the clips in place are also capable of serving as a means of connecting the ends of the conveyor web to form as an endless belt. As previously mentioned, the web is perforated at equal intervals. By aligning the perforations at opposite ends of the web, the pins and other fastening means which secure the clips in place may also serve to connect the overlapping ends of the web to produce an endless structure.

In a preferred form of construction, the clips are provided at their upper ends with laterally extending arms having substantially semi-cylindrical sockets in their outer ends. These sockets are designed to engage the cylindrical surfaces of rods or pins mounted in spaced angular relation about the periphery of a pulley or a sprocket. Thus the teeth of the sprocket may either engage in notches in the clips, or notches in the sprocket may engage rounded projections on the clips.

These and other objects and novel features of the present invention will be more clearly and fully set forth in the following specification and claims.

In the drawings forming a part of the specification.

FIG. 2 is a perspective view of the overlapping ends of flexible web, showing the manner in which the web is secured to form an endless belt, and showing a pair of clips mounted upon one side of the web.

FIG. 3 is a vertical sectional view of the web and a portion of a sprocket structure about which the web is designed to extend.

FIG. 4 is a vertical sectional view through the web and centrally through a pair of clips secured on opposite surfaces of the web.

FIG. 5 is a plan view of a portion of the web as it curves about a supporting sprocket.

FIG. 6 is a vertical sectional view through a modified form of sprocket and modified form of clip.

FIG. 7 is a vertical sectional view through the web showing the modified form of clip illustrated in FIG. 6.

FIG. 8 is a perspective view of one of the clips shown in FIGS. 6 and 7 removed from the supporting web.

FIG. 9 is a view similar to FIG. 5, but showing the modified form of clip and sprocket used in conjunction therewith.

Figure 1:
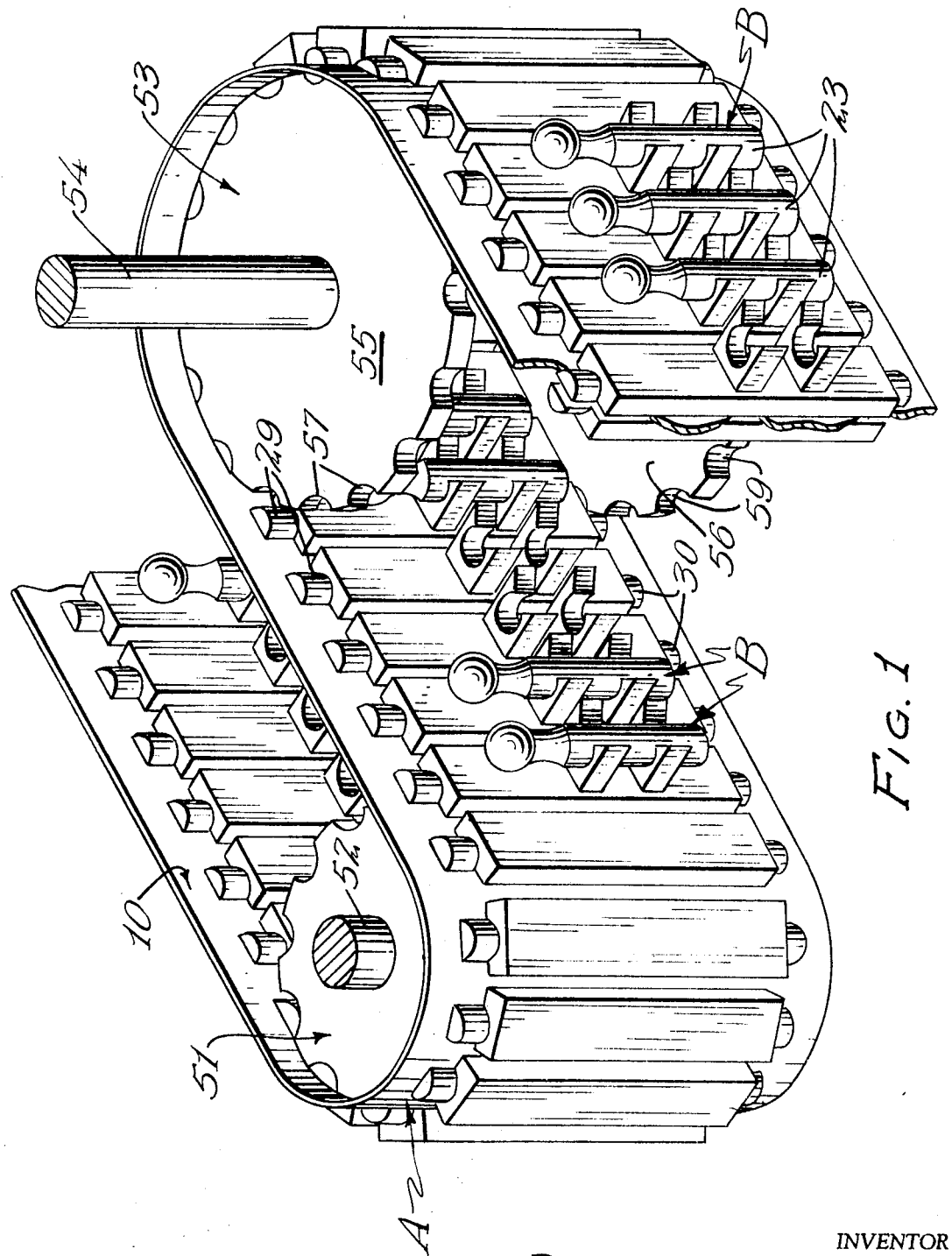
FIG. 1 is a perspective view of a section of the conveyor shown as extending about two directions changing sprocket members to indicate opposite sides of the conveyor, certain of the clips being broken away to simplify the showing.

The conveyor illustrated may be used for a wide variety of elongated objects which are of uniform shape. In designing a conveyor for the purpose described, a web of metal such as spring steel was selected as the carrier medium. Where the conveyor is designed to carry certain objects, considerable weight is involved, particularly when it is considered that clips are provided on opposite sides of the web, and the objects are supported in closely spaced vertical relation. The metal web is indicated in general by the numeral 10, and is of a vertical height somewhat greater than the length of the objects B which are supported thereby. By making the conveyor web of substantial height, a belt of the type described is capable of supporting quite considerable weight between supports. In other words, the normal tendency for the belt to sag between supports is to a large degree eliminated by supporting the web in an upright position.

The clips 11 are formed as best illustrated in FIGS. 2 and 4 of the drawings. Each clip 11 comprises a hollow box-like structure including parallel vertical sides 12 connected at their upper ends by horizontal cross-member 13 and connected at their lower ends by a horizontal projecting ledge 14 which projects well beyond the vertical sides to act as a support for the lower end of the object B. The outer extremity of the supporting ledge 14 is bevelled or tapered as indicated at 15 to guide the object into position as it is forced into the clip.

Each clip is provided with a pair of spaced lower arms 16, and a pair of upper arms 17, which arms project forwardly from the box-like body of the clip. The arms 16 are provided with outwardly diverging or outwardly tapered ends 20. Arcuate notches 21 are provided in opposed relation in the inner surfaces of the arms 16, and similarly opposed notches 22 are provided in the inner surfaces of the arms 17. The aligned notches 21 and 22 are curved to fit the arcuation of the outer surface of the cylindrical object B. The arms 16 and 17, as well as the entire clip 11, is preferably formed of a plastic material which is sufficiently resilient to permit the arms to flex apart the amount necessary to accept the body 23 of the object 23 therebetween. At the same time, the arms are sufficiently rigid to hold the object in place while the conveyor is moving at the necessary speed in its tortuous path.

Each clip 11 is provided with a vertical base panel 24 which extends between the clip sides 12 and the top and bottom ends 13 and 14. A pair of cylindrical bosses 25 project forwardly from the base 24 at points spaced from the upper and lower ends of the clip frames. Vertically spaced rectangular bosses 26 and 27 project forwardly from the clip base 24 above and below the upper arms 17, and a similar rectangular boss 28 projects forwardly from the base just above the lower arms 16. Substantially semi-cylindrical bearing members 29 and 30 project upwardly and downwardly from the upper frame end 13 and the ledge 14 at the bottom of the clip to act as guides when the conveyor is passing about the conveyor supporting sprockets. The clips 11 on opposite sides of the web 10 are connected together by bolts 31 extending through the cylindrical boss 25 of one clip and threaded into the aligned cylindrical boss of the opposed clip on the opposite side of the web, the bolts 31 extending through the web.

As is indicated in FIG. 2 of the drawings, the web 10 is punched at equal intervals throughout its length to provide rows of apertures extending transversely of the length of the web. In the particular arrangement illustrated, there are seven apertures in each of the transverse rows. The upper and lower rows of apertures 33 and 34 are designed to accommodate pins 35 and 36 respectively which extend through the webs and extend into opposed sockets 37 and 39 in the semi-cylindrical upper projections 29 and the semi-cylindrical lower projections 30 respectively. The pins 35 and 36 serve merely to assist aligning the clips and holding them in properly spaced parallel relation on the web.

The second aperture of each row from the top of the belt as indicated by the numeral 40 and the second aperture from the lower edge of the belt as indicated by the numeral 41 serve as apertures to accommodate the bolts 31 securing the clips in place on opposite sides of the web.

As indicated in FIG. 2, the ends of the web 10 are overlapped, one web end being indicated by the numeral 42, and the other end being indicated by the numeral 43. The ends of the web are held in overlapping relation by the pins 35 and 36 extending through the upper and lower rows of apertures 33 and 34, as well as by the bolts 31 extending through the apertures 40 and 41. The overlapping relation of the belt may be further secured by pins 44 extending through the center apertures of each row indicated at 45, as well as by the pins 46 extending through the rows of apertures 47 above and below the central apertures 45. The pins 46 may extend into sockets 49 in the rectangular bosses 26 and in the rectangular boss 28, while the pins 44 may extend into opposed sockets 50 in the square bosses 27 of the opposed clips. The additional pins 44 and 46 are provided merely as a means of reinforcing the overlapping connection between the end of the web.

As indicated in FIGS. 1, 3, and 5 of the drawings, the web 10 is designed to flex about sprocket structures designed to change the direction of the conveyor. FIG. 1 of the drawings shows a sprocket structure 51 mounted upon a vertical shaft 52 and engageable with one surface of the web 10 which may be considered the inner surface of the endless belt. The conveyor is also shown as extending about a second sprocket structure 53 mounted upon a vertical shaft 54, and designed to engage the opposite surface of the web which may be considered the outer surface thereof. Each of the sprocket structures are of similar form.

The sprocket structure 53 includes an upper sprocket member 55 and a lower member sprocket member 56 in vertically spaced parallel relation. Each of the sprocket members 55 and 56 are provided with substantially semi-cylindrical notches, the notches in the sprocket member 55 being indicated at 57, and the socket members of the sprocket member 56 being indicated at 59. The sprocket members 55 and 56 are spaced apart a distance substantially equal to the height of the body portion of the clips 11. As a result, the notches of the upper sprocket members 55 are designed to accommodate the bearing members 29 projecting upwardly from the clips 11, while the notches 59 of the lower sprocket member 56 are designed to accommodate the semi-circular bearing members 30 projecting downwardly from the ledge 14.

It will be noted that the pairs of arms 16 and 17 which support the object 23 of the object B are sufficiently long so that the object is spaced forwardly from the body portions of the clips 11. This permits suitable cam means to extend between the clip bodies and the objects B, preferably between the pairs of arms 16 and 17, to strip the objects from the conveyor.

FIGS. 6 through 9 of the drawings discloses a modified form of construction which may be used in place of the construction previously described. Actually, the main difference lies in the manner in which the gears of sprockets engage the clips forming a part of the conveyor belt. FIG. 9 of the drawings as compared to FIG. 2 thereof, shows the difference between the type of clips which are used in one construction and in another. In certain respects, the structure shown in these figures is preferable to the previously described structure.

An examination of FIG. 8 will illustrate the fact that the clip 60 illustrated therein includes a pair of parallel sides 61, the lower ends of which are connected by a ledge 62 which may be identical to the ledge 14 described in the construction illustrated in FIG. 2. The clip 60 is also provided with a lower pair of arms 63 and an upper pair of arms 64 which correspond to the arms 16 and 17 of the clip 11. In other words, the bracket 60 which is illustrated in FIG. 8 of the drawings is virtually identical to that illustrated in FIG. 2 of the drawings with the exception of the fact that at the upper end of each clip 60 is provided an arm 65 which projects normally to the base of the clip, and extends beyond the length of the arms 63 and 64. The outer end of the arm 65, which projects normally to the base of the clip, extends beyond the length of the arms 63 and 64. The outer end of the arm 65 is provided with a substantially semi-cylindrical notch 66 which is provided for the purpose of engaging sprockets which time the movement of the conveyor.

FIG. 9 of the drawings indicates a sprocket wheel 69 having a series of cylindrical projections 70 on the outer surface thereof which are properly spaced to accommodate the notches 66 of the clips 60. In other words, the structure shown in FIGS. 7 through 9 of the drawings is virtually identical with that illustrated in the previous figures except for the fact that the clips 60 are provided at their upper extremity with the laterally projecting arms 65 which are extrenally notched to accommodate projections on the sprockets 69. Thus the only difference between the construction illustrated in these figures lies in the manner in which the individual clips of the conveyor engage the sprockets which change the direction of travel of the conveyor belt 10.

An examination of FIG. 7 of the drawings indicates a typical support on the conveyor which may be provided intermediate the extremities of the endless belt forming the conveyor. As indicated in FIG. 7 of the drawings, the structure supporting the conveyor is provided with a vertical bracket 75 which is provided with an upper lateral flange 76, and a lower lateral flange 77. The upper flange 76 as well as the lower flange 77, is apertured to accommodate bolts 80 and 82 which support guiding rollers. Rollers 81 are mounted upon the upper bolts 80, and similar guiding rollers 83 which are axially aligned with the rollers 81 are mounted upon the bracket member 97. The rollers 81 and 83 are usually in actual practice roller bearings which may rotate freely upon engagement with the web 10, but which still may hold the web 10, in its vertical relationship between supporting stations. Similar cylindrical rollers may be used instead of sprockets to change the direction of the web if it is so desired.

As shown in FIG. 6 of the drawings, the pulley C includes a disc 85 mounted upon a hub 86 and supporting a cylindrical ring 87 from which a short upper ring-shaped flange 89 and a lower ring-shaped flange 90 project in vertically spaced relation. The upper flange 89 supports the cylindrical projection 70, while the lower arm 62 of the clip 60 rests upon the lower flange 90. The web 10 is held against the outer surface of the flange 90 as the conveyor travels about the pulley 69.

The type of construction shown in FIG. 8 has the advantage that but one pulley, such as the pulley C may be required for properly supporting the conveyor belt, in view of the fact that the various clips 60 on one side of the web 10 rest upon the horizontally extending ledge 90 of the pulley C. In other words, the two constructions are equivalent of one another except for the fact that in one instance, the sprocket is provided with sockets which engage on opposite sides of the drive portions, while in the other structure, the conveyor is provided with spaced sockets into which the projections of the driving sprocket may engage.

The clips 11 and 60 have been described as being made of resilient plastic. It should be understood however, that the clips need not be resilient if means are provided for holding the objects B in place. As an example, where the objects B are made of magnetic metal, the objects may be magnetically held in place. Alternatively, rails may be provided for holding the objects in the clips. Making the clips of resilient material is normally advantageous.

While the foregoing description has described the objects as being elongated and supported in vertical relation on the web, it should be understood that the objects may be otherwise shaped as long as they are adaptable for support by the clips which would be specifically designed for their profile.

In accordance with the patent statutes, I have described the principles of construction and operation of my improvement in conveyor for elongated articles, and while I have endeavored to set forth the best embodiment thereof, I desire to have it understood that changes may be made within the scope of the following claims without departing from the spirit of my invention.

I claim:
1. A conveyor for elongated objects including:
   a vertical web of flexible material,
   means supporting said web in a substantially vertical position,
   clip means secured to said web and designed to support articles thereupon,
   said clips supporting said objects in vertically spaced relation on said web,
   said clips being mounted on opposite sides of the web.
2. The structure of claim 1 and in which said web is formed of spring steel.
3. The structure of claim 1 and in which each of said clips includes a pair of resilient arms between which said objects are resiliently engaged.
4. The structure of claim 1 and including means on said clips engageable with sprockets, and including sprockets engageable with said sprocket engaging means.
5. The structure of claim 1 and in which said clips supporting said objects include horizontally spaced resilient arms.
6. The structure of claim 5 and in which said clips support a plurality of vertically spaced arms between which said objects are resiliently engaged.
7. The structure of claim 1 and in which said clips support said objects in outwardly spaced relation to said vertical web.
8. The structure of claim 1 and in which said clips include means engageable with a sprocket.
9. The structure of claim 8 and in which said means engageable with a sprocket include notched arms.
10. The structure of claim 1 and in which said clips include means extending beneath said objects to support the same.

References Cited
UNITED STATES PATENTS 3,171,535   3/1965   Harris _____ 198—131

EDWARD A. SROKA, Primary Examiner

U.S. Cl. X.R.
198—179